United States Patent [19]

Hayes et al.

[11] Patent Number: 5,497,480

[45] Date of Patent: Mar. 5, 1996

[54] BROADCAST DEMAP FOR DEALLOCATING MEMORY PAGES IN A MULTIPROCESSOR SYSTEM

[75] Inventors: Norman M. Hayes, Sunnyvale; Pradeep Sindhu, Mountain View; Jean-Marc Frailong, Palo Alto; Sunil Nanda, Los Altos, all of Calif.

[73] Assignees: Sun Microsystems, Inc., Mountain View, Calif.; Xerox Corporation, Stamford, Conn.

[21] Appl. No.: 282,170

[22] Filed: Jul. 29, 1994

Related U.S. Application Data

[63] Continuation of Ser. No. 870,357, Apr. 17, 1992, abandoned, which is a continuation-in-part of Ser. No. 636,446, Dec. 31, 1990, Pat. No. 5,195,089.

[51] Int. Cl.$^6$ .............................. G06F 12/12; H04J 3/24
[52] U.S. Cl. .................. 395/493; 395/417; 370/94.1; 364/DIG. 1; 364/243.4; 364/256.4; 364/246.11; 364/DIG. 2; 364/942.08; 364/964.25
[58] Field of Search .............................. 395/425, 417, 395/486, 462, 471, 493; 370/94.1

[56] References Cited

U.S. PATENT DOCUMENTS

| | | | |
|---|---|---|---|
| 4,525,778 | 6/1985 | Cane | 395/425 |
| 4,733,348 | 3/1988 | Hiraoka et al. | 395/425 |
| 4,779,188 | 10/1988 | Gum et al. | 395/500 |
| 5,195,089 | 3/1993 | Sindhu et al. | 370/85.1 |

OTHER PUBLICATIONS

The SPARC™ Architecture Manual, Version 8 (Dec. 11, 1990) Sun Microsystems, Inc.; Mountain View, CA; pp. 237–255.

Primary Examiner—Tod R. Swann
Assistant Examiner—Reginald G. Bragdon
Attorney, Agent, or Firm—Blakely Sokoloff Taylor & Zafman

[57] ABSTRACT

A method and apparatus for removing a page table entry from a plurality of translation lookaside buffers ("TLBs") in a multiprocessor computer system. The multiprocessor computer system includes at least two processors coupled to a packet-switched bus. Page table entries are removed from a plurality of TLBs in the multiprocessor computer system by first broadcasting a demap request packet on the packet-switched bus in response to one of the processors requesting that a page table entry be removed from its associated TLB. The demap request packet includes a virtual address and context information specifying this page table entry. Controllers reply to the demap request packet by sending a first reply packet to the controller that sent the original demap request packet to indicate receipt of the demap request packet. If a controller removes the page table entry from its associated TLB, that controller sends a second demap reply packet to indicate that the page table entry has been removed from its associated TLB.

11 Claims, 3 Drawing Sheets

BROADCAST DEMAP FOR DEALLOCATING MEMORY PAGES IN A MULTIPROCESSOR SYSTEM

RELATED PATENT APPLICATIONS

This is a continuation application of application Ser. No. 07/870,357, filed on Apr. 17, 1992, abandoned, which is a continuation-in-part of application Ser. No. 07/636,446, issued as U.S. Pat. No. 5,195,089, filed on Dec. 31, 1990.

BACKGROUND OF THE INVENTION

1. Field of the Invention

The present invention relates to virtually addressed memory operations in a multiprocessor computer system and more specifically to the translation lookaside buffers in such a system.

2. Art Background

In a computer system it is quite common for a central processing unit ("CPU") to have a cache memory to speed up memory access operations to main memory of the computer system. The cache memory is smaller, but much faster than main memory. It is placed operationally between the CPU and main memory. During the execution of a software program, the cache memory stores the most frequently utilized instructions and data. Whenever the processor needs to access information from main memory, the processor examines the cache first before accessing main memory. A cache miss occurs if the processor cannot find instructions or data in the cache memory and is required to access the slower main memory. Thus, the cache memory reduces the average memory access time of the CPU. For further information on cache memories, please refer to *Computer Architecture: A Quantitative Approach,* by John L. Hennessy and David A. Patterson, (Morgan, Kaufman Publishers, Inc., 1990).

In present day computing technology it is common to have a process executing only in main memory ("physical memory") while a programmer or user perceives a much larger memory which is allocated on an external disk ("virtual memory"). Virtual memory allows for very effective multi-programming and relieves the user of the unnecessarily tight constraint of main memory. To address the virtual memory, many processors contain a translator to translate virtual addresses in virtual memory to physical addresses in physical memory, and a translation lookaside buffer ("TLB"), which caches recently generated virtual-physical address pairs. The TLBs are essential because they allow faster access to main memory by skipping the mapping process when the translation pairs already exist. A TLB entry is like a cache entry where a tag holds portions of the virtual address and a data portion typically holds a physical page frame number, protection field, used bit and dirty bit.

When a page mapping of virtual-to-physical addresses of a given process is swapped out or thrashed as the process requires, the mapping has to be disposed of. If not, the next process issuing a virtual address may end up getting the mapping from the previous process, as the virtual addresses are reused by each process. In a single processor computer system, a flush command is typically sent to the TLB to demap the target page.

In a multiprocessor computer system with shared memory, however, sending an individual flush command to a processor becomes an expensive task since each processor along the system bus may have a copy of that page. Although interrupts can be sent to the processors, as is typically done in a single processor system, issuing interrupts to all the processors involves getting control of the system bus and stopping each processor's execution. Further, the processors, upon receiving the interrupts, will have to issue the same flush command to their respective TLBs and reply the issuing processor after getting control of the system bus. As each process becomes more complicated and the number of processors increases, the system-wide interrupts are occurring most of the time, since each of the processors may be running a job and issuing flush commands to all the other processors throughout the system.

SUMMARY OF THE INVENTION

Therefore, it is an object of the present invention to provide a broadcast page removal scheme for all the processors in a multiprocessor computer system.

It is also an object of the present invention to provide a broadcast page removal scheme for all the processors without incurring the penalties associated with issuing and receiving interrupts in a multiprocessor computer system.

A method and apparatus for removing a page table entry from a plurality of translation lookaside buffers ("TLB's") coupled to a plurality of processors in a multiprocessor system is disclosed. The method comprises the steps of issuing a request packet by a first controller of the first TLB to remove the page table entry from the first TLB; sending the request packet to the packet-switched bus to be broadcast to a second controller coupled to a second TLB with the request packet specifying a predetermined source, the first address mode and process identification; receiving the request packet by the second controller on the packet-switched bus; checking by the second controller to determine whether the second TLB contains the page table entry by comparing the first mode address and process identification; completing any pending operations for the second processor; removing the page table entry from the second TLB by the second controller if the page table entry is contained in the second TLB; issuing a reply packet by the second controller to indicate completion to the first controller; sending the reply packet to the packet-switched bus to be forwarded to the first controller with the reply packet identifying the source.

BRIEF DESCRIPTION OF THE DRAWINGS

The objects, features and advantages of the present invention will be apparent from the following detailed description of the preferred embodiment in which.

DETAILED DESCRIPTION OF THE INVENTION

A method and apparatus for deallocating memory translation pages in a multiprocessor computer system is disclosed. In the following description for purposes of explanation, specific memories, organizations, and architectures, etc. are set forth in order to provide a thorough understanding of the present invention. However, it will be apparent to one skilled in the art that the present invention may be practiced without these specific details. In other instances, well known circuits are shown in block diagram form in order not to obscure the present invention unnecessarily.

Figure 1:
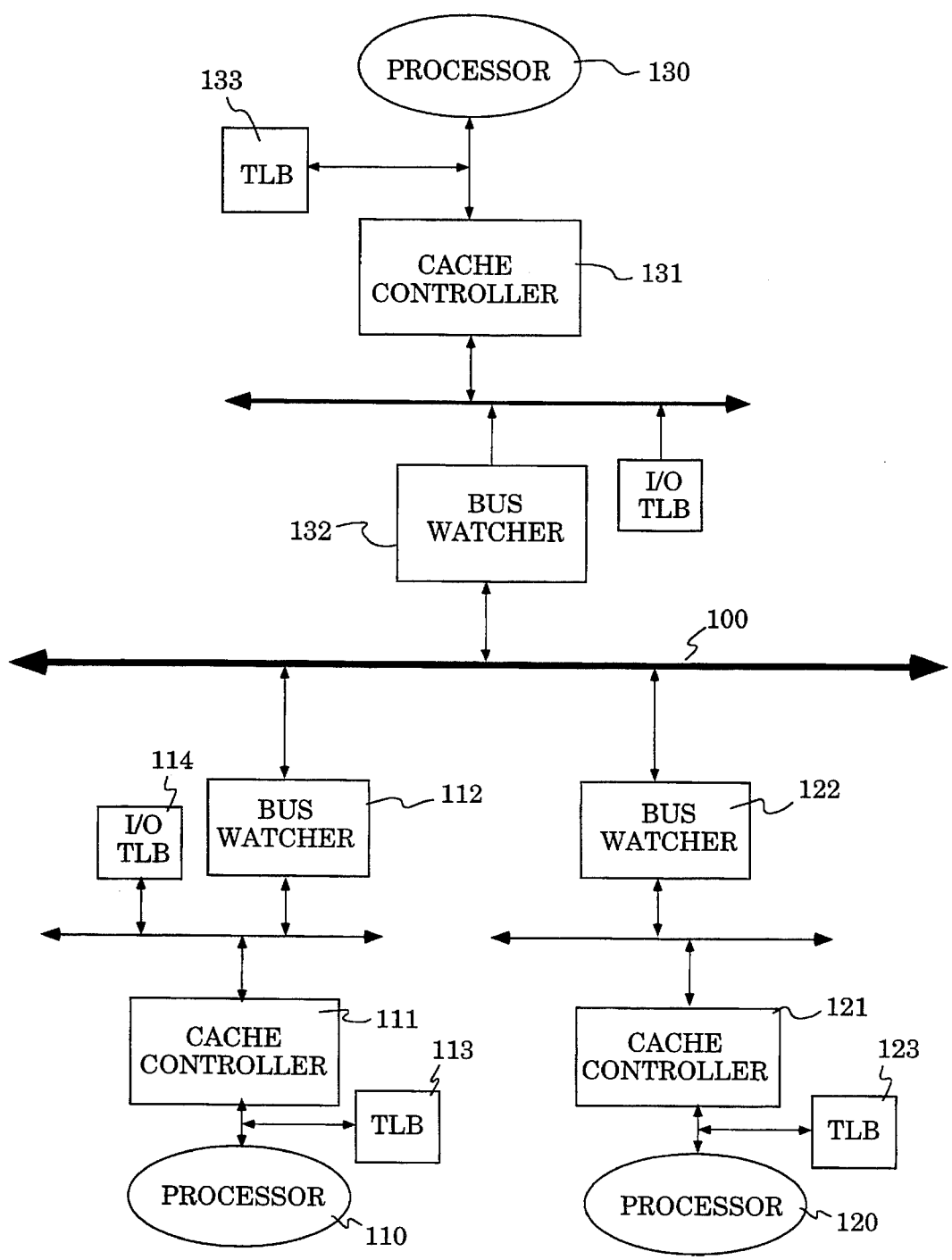
FIG. 1 is a simplified block diagram of a multiprocessor computer system.

Reference is now made to FIG. 1, where a simplified block diagram of a multiprocessor computer system is illustrated. Processor 110 is coupled to system bus 100 through cache controller 111 and bus watcher 112. Processor 110 also utilizes translation lookaside buffer ("TLB") such as I/O TLB 114 or system TLB 113 to store its already translated virtual-to-physical address mapping in conjunction with its cache (not shown). Processors 120 and 130 are similarly coupled to system bus 100 through their respective cache controllers and bus watchers. When processor 110 needs to demap a virtual-to-physical mapping for one or more virtual pages, its cache controller 111 issues a broadcast demap request packet onto system bus 100 through bus watcher 112. As other bus watchers 122 and 132 receive the demap request packet, they forward the demap request packet to their respective cache controllers 121 and 131 for execution. After other cache controllers complete their respective demap, if the target page is present, cache controllers 121 and 131 issue demap reply packets through their respective bus watchers 122 and 132 and system bus 110 to inform bus watcher 112 of issuing processor 110 that the demap is complete in all other caches. Bus watcher 112 then issues a demap reply to notify issuing processor 110 that all other processors are done.

Figure 2:
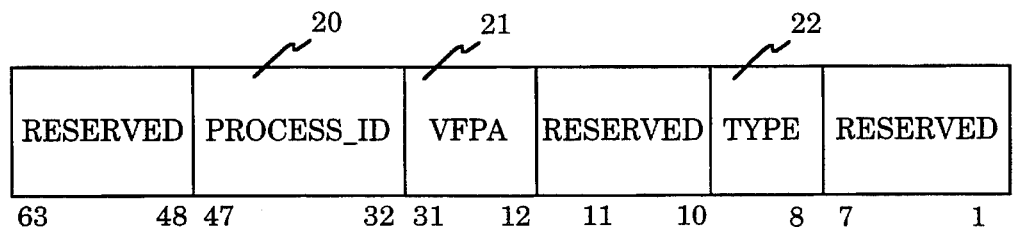
FIG. 2 is a symbolic representation of a data cycle in a broadcast demap request.

In the current embodiment, a demap request packet consists of two cycles: in the header cycle, the address field are set to all zeros to indicate a broadcast packet, while the entity to be demapped is specified in the data cycle as shown in FIG. 2. A demap reply packet acknowledges an earlier demap request packet; it is currently two cycles long. The first cycle contains the header cycle with the address field set to all zeros. The second cycle is unused and its contents are "don't care". Internally, the demap transactions are generated by a processor's memory flush operations. The information transmitted for a demap includes virtual address ("VFPA" 21) and Type 22 which are used as criteria to match pages in the TLB for removal. Process_Id 20, commonly known as "context" in the art, to be used for the demap transaction is broadcast in bits 47 through 32, as shown in FIG. 2. The lower 32 bits are equivalent to the data format of a flush operation.

In addition to broadcasting a demap transaction through a system bus, a processor can receive external demaps. Referring to FIG. 1, when demap from processor 110 is received by processor 120, processor 120 executes the demap as if it had been generated internally, only using the provided process identification rather than the current internal process identification. Currently, a processor requires a single ready reply for the demap operation. The system hardware will be responsible to ensure that the demap transaction is broadcast to and completed by all cache controllers in the system. Currently, incoming demaps use a two phase request/reply protocol. To reduce the amount of state that must be kept by bus watchers, only a single demap transaction may be pending in the system at any one time.

Figure 3:
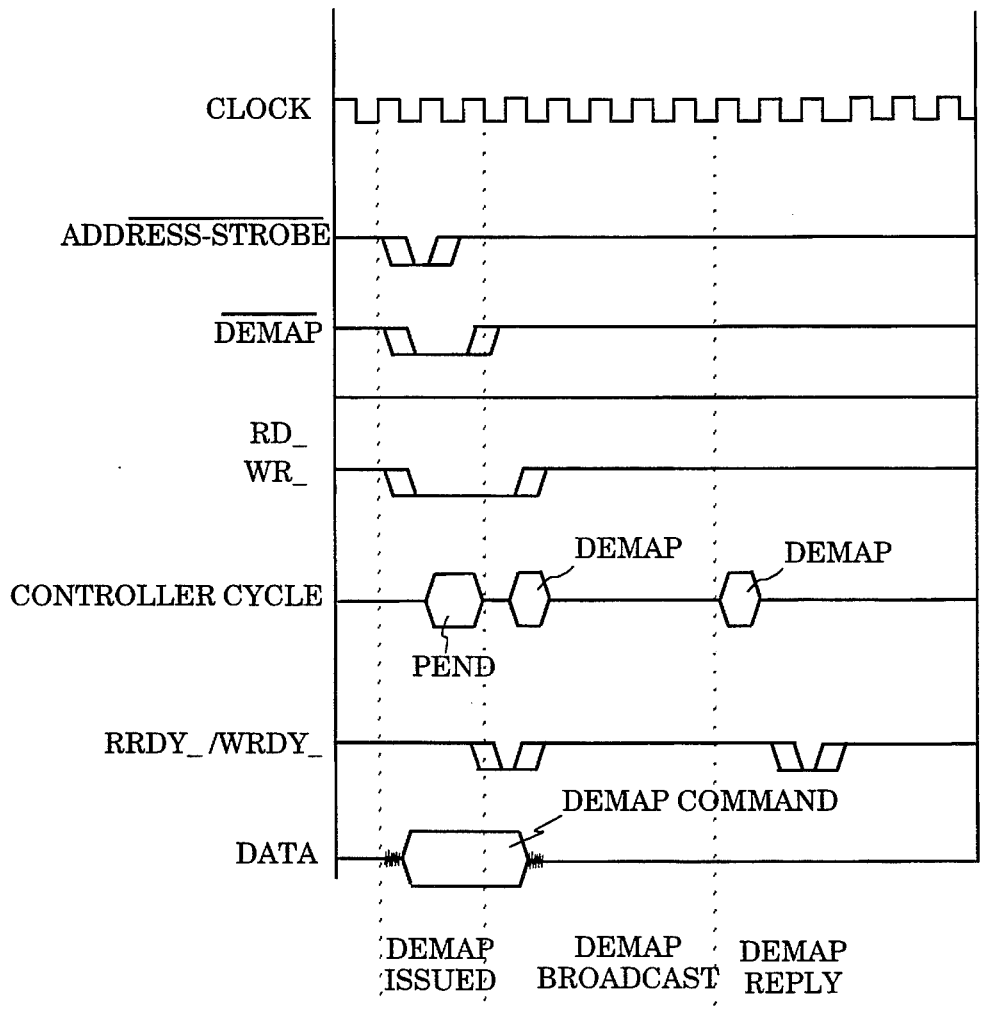
FIG. 3 is a timing diagram for a processor-initiated demap transaction.

Referring to FIG. 3, a timing diagram for a processor-initiated demap transaction is illustrated. In this case, the demap transaction is used by a processor to remove a page table entry from all TLBs in the multiprocessor system. In this type of system, a demap may affect an I/O TLB, other processors' system TLB or simply be reflected back by the cache controller with no action taken by that processor. The timing for the demap is similar to a swap, i.e. two replies are currently required. The first reply uses WRDY_ to acknowledge receipt of the demap request. The second reply informs the processor that the demap has successfully completed across the system, and its signal with the RRDY_ signal. Both ready signals WRDY_ and RRDY_ may be asserted at the same time as shown in FIG. 3, but two separate ready responses should be given. Exceptions may be reported to a demap by asserting the exception signal (not shown) along with the RRDY_ response.

As shown in FIG. 3, the demap is signaled by asserting the Demap-bar and Address-Strobe-bar signals. All information for the demap, including the virtual address, process identification and command information is passed during data cycle [63:0]. The address is "don't care" for demap and is set to be all zeros as in the format shown.

If there are some systems coupled to a processor that choose not to take any action in response to a demap, those systems must respond to the demap with two RRDY_ assertions. In this case, the cache controller may hold RRDY_/WRDY_ active for two consecutive cycles.

Figure 4:
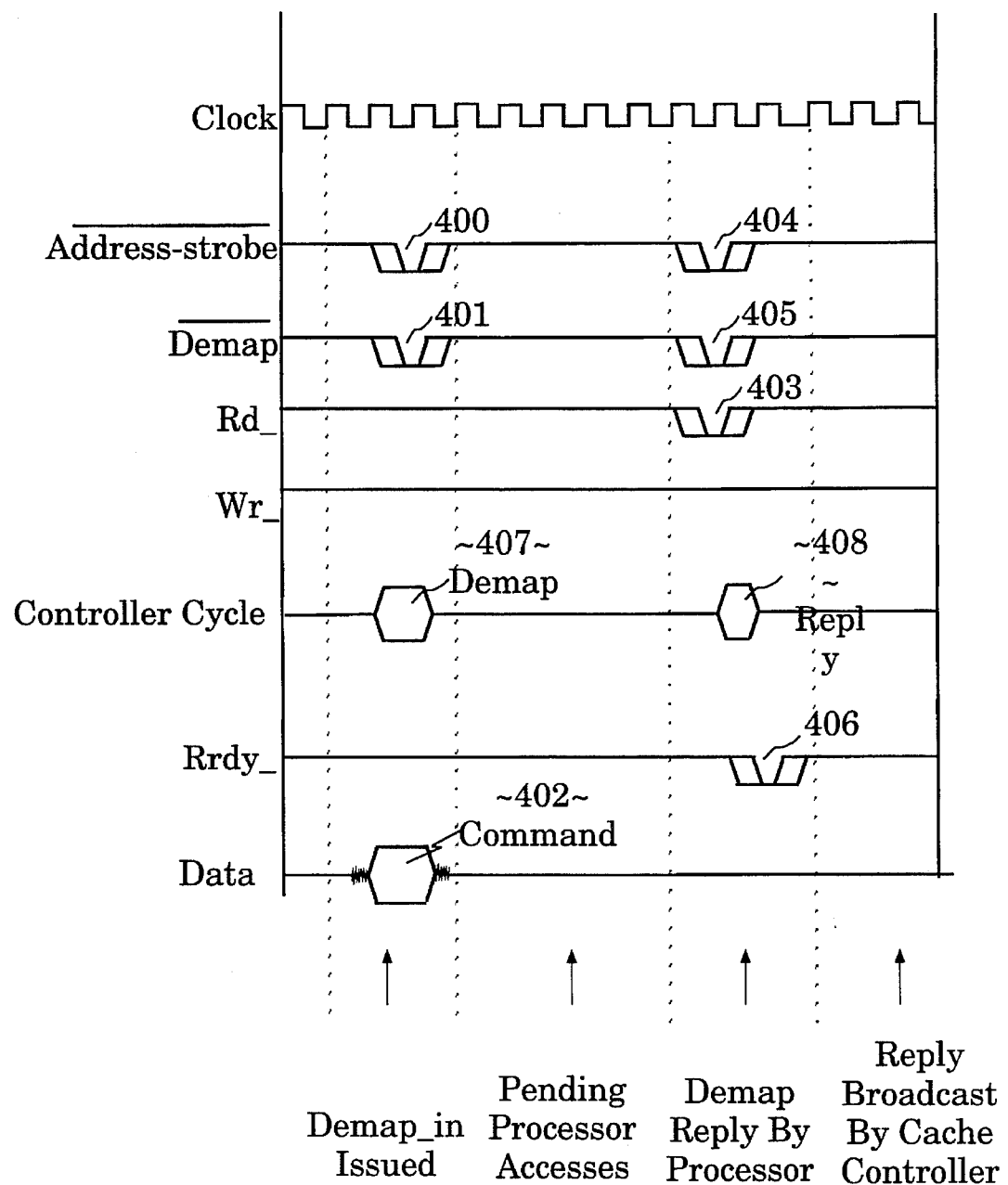
FIG. 4 is a timing diagram for an external demap request transaction.

Reference is now made to FIG. 4, where a timing diagram for an external demap request transaction is illustrated. When a demap is broadcasted, an incoming demap uses a two phase protocol. The first phase of the protocol is an external demap request 407. The second phase is a reply 408 to that request. There may be other bus activity between the request and reply allowed.

The request 407 portion of the demap is issued by an external bus master activating Address-Strobe-bar 400 and Demap-bar 401. Data cycle [63:0] 402 should contain a demap command 402 in the format described in FIG. 2. This command should be issued on the bus for the single cycle. Currently, a processor may not respond to this request immediately due to pending operations, which should be completed before responding to a demap request.

Once the external request 407 has been serviced internally, a processor will begin a demap reply 408 transaction. This reply 408 appears on the bus similar to an internally generated demap with the major difference being that it is signaled as a RD_ 403, rather than write. Note that WR_ remains unchanged throughout. The reply is signaled by the processor asserting Address-Strobe-bar 404, RD_403, and Demap-bar 405. To complete a transaction a ready (RRDY_ 406) should be responded by the system logic.

What is claimed is:

1. A method for removing an invalid page table entry from a plurality of translation lookaside buffers (TLBs) in a multiprocessor computer system having at least two processors coupled to a packet-switched bus, said invalid page table entry being specified by a virtual address and a process identification, said invalid page table entry being an invalid mapping between said virtual address and a physical address, said method comprising the steps of:

broadcasting a demap request packet on said packet-switched bus by a first controller via a first bus watcher in response to a first processor of said at least two processors requesting that said invalid page table entry be removed from a first TLB controlled by said first controller, wherein said demap request packet comprises data specifying said virtual address and process identification of said invalid page table entry;

receiving said demap request packet on said packet-switched bus by a second controller via a second bus watcher;

sending a first demap reply packet on said packet-switched bus to said first controller via said first and second bus watchers by said second controller to indicate that said second controller has received said demap request packet;

checking by said second controller to determine whether a second TLB controlled by said second controller contains said invalid page table entry by comparing said virtual address and said process identification to entries contained in said second TLB;

completing pending operations for a second processor of said at least two processors, wherein said second TLB stores page table entries for use by said second processor;

removing said invalid page table entry from said second TLB by said second controller if said invalid page table entry is contained in said second TLB;

sending a second demap reply packet on said packet-switched bus to said first controller via said second and first bus watchers by said second controller after removal of said invalid page table entry from said second TLB to indicate that said second controller has processed said demap request packet.

2. The method of claim 1, wherein the step of broadcasting further comprises the steps of:

broadcasting a header during a first cycle, said header specifying a destination and said first processor as a source;

broadcasting data during a second cycle, said data specifying said virtual address and said process identification of said invalid page table entry.

3. The method of claim 2, further comprising a step of snooping on said packet-switched bus by said first controller for reply packets identifying said first processor as their destination.

4. The method of claim 3, wherein said multiprocessor computer system further includes a third controller coupled to a third processor and to said packet-switched bus, said method further comprising a step of snooping on said packet-switched bus by said third controller for packets identifying said third processor as their destination.

5. The method of claim 4, said method further comprising a step of snooping on said packet-switched by said second controller for packets identifying said second one of said at least two processors as their destination.

6. The method of claim 5, wherein said step of sending said first demap reply packet is performed by both said second controller and said third controller when said second and third controllers snoop said demap request packet and said demap request packet specifies said destination as being equal to all logic 0's.

7. An apparatus for removing an invalid page table entry from a plurality of translation lookaside buffers (TLBs) in a multiprocessor computer system having at least two processors coupled to a packet-switched bus, said invalid page table entry being specified by a virtual address and a process identification, said apparatus comprising:

a first controller, coupled to said packet switched bus and a first one of said at least two processors, said first controller for broadcasting a demap request packet on said packet-switched bus in response to said first one of said at least two processors requesting that said invalid page table entry be removed from a first TLB controlled by said first controller, wherein said demap request packet comprises data specifying said virtual address and process identification of said invalid page table entry; and a second controller coupled to said packet-switched bus and a second one of said at least two processors, said second controller for receiving said demap request packet on said packet-switched bus, for sending a first demap reply packet on said packet-switched bus to said first controller to indicate that said second controller has received said demap request packet, for determining whether a second TLB controlled by said second controller contains said invalid page table entry by comparing said virtual address and said process identification to entries contained in said second TLB, for removing said invalid page table entry from said second TLB if said invalid page table entry is contained in said second TLB, and for sending a second demap reply packet on said packet-switched bus to said first controller after removal of said invalid page table entry from said second TLB to indicate that said second controller has processed said demap request packet, said second controller allowing said second one of said at least two processors to complete pending operations before said second controller removes said invalid page table entry from said second TLB.

8. The apparatus of claim 7, wherein said demap request packet is a two cycle packet in which a header is broadcast during a first cycle and data is broadcast during a second cycle, said header specifying a destination and said first one of said at least two processors as a source, said data specifying said virtual address and said process identification of said invalid page table entry.

9. The apparatus of claim 8, the apparatus further comprising a first bus watcher, coupled to said first controller and said packet-switched bus, for snooping on said packet-switched bus for reply packets having said first one of said at least two processors specified as their destination.

10. The apparatus of claim 9, wherein the multiprocessor computer system further includes:

a second bus watcher, coupled to said second controller and said packet-switched bus, for snooping on said packet-switched bus for reply packets having said second one of said at least two processors specified as their destination, for sending a reply packet if said demap request packet specifies said second one of at least two processors as said destination, and for sending a reply packet if said demap request packet specifies all logic 0's as said destination; and a third bus watcher, coupled to said third controller and said packet-switched bus, for snooping on said packet-switched bus for reply packets having said third processor specified as their destination, for sending a reply packet if said demap request packet specifies said third processor as said destination, and for sending a reply packet if said demap request packet specifies all logic 0's as said destination.

11. A method for removing a page table entry from a plurality of cache memories in a multiprocessor computer system having at least two processors coupled to a packet-switched bus, the method comprising the steps of:

broadcasting a demap request packet on the packet-switched bus by a first controller via a first bus watcher in response to a first one of the at least two processors requesting that the page table entry be removed from a first cache memory controlled by a first cache controller, the demap request packet including a virtual address and context information specifying the page table entry;

receiving the demap request packet on the packet-switched bus by a second cache controller via a second bus watcher;

sending a first demap reply packet on the packet-switched bus to the first cache controller via the first and second bus watchers by the second cache controller to indicate that the second cache controller has received the demap request packet;

removing the page table entry from the second cache memory by the second cache controller if the page table entry is contained in the second cache memory; and sending a second demap reply packet on the packet-switched bus to the first cache controller via the second and first bus watchers by the second cache controller to indicate that the second cache controller has processed the demap request packet.

* * * * *